United States Patent
Inooka et al.

(10) Patent No.: US 8,146,167 B2
(45) Date of Patent: Mar. 27, 2012

(54) USE MANAGEMENT METHOD FOR PERIPHERAL DEVICE, ELECTRONIC SYSTEM AND COMPONENT DEVICE THEREOF

(75) Inventors: Hidehiro Inooka, Tokyo (JP); Tsutomu Inui, Chiba (JP); Mariko Kitajima, Tokyo (JP); Kazuhiro Kanee, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 1042 days.

(21) Appl. No.: 11/494,590

(22) Filed: Jul. 28, 2006

(65) Prior Publication Data

US 2007/0038827 A1 Feb. 15, 2007

(30) Foreign Application Priority Data

Jul. 29, 2005 (JP) ................................. 2005-220012

(51) Int. Cl.
    *G06F 7/04* (2006.01)
(52) U.S. Cl. .............. 726/27; 726/4; 711/111; 711/112; 386/252; 380/200; 380/201; 380/44; 380/29; 713/193
(58) Field of Classification Search ........................ None
    See application file for complete search history.

(56) References Cited

U.S. PATENT DOCUMENTS

| 5,473,595 | A | 12/1995 | Hayashi |
| 7,757,077 | B2 * | 7/2010 | Peinado et al. ............... 713/156 |
| 2002/0184046 | A1 * | 12/2002 | Kamada et al. .................. 705/1 |
| 2003/0200435 | A1 * | 10/2003 | England et al. ............... 713/172 |
| 2007/0124602 | A1 * | 5/2007 | Wald et al. .................... 713/193 |
| 2008/0072040 | A1 * | 3/2008 | Asano et al. .................. 713/158 |

FOREIGN PATENT DOCUMENTS

| JP | 6168212 A | 6/1994 |
| JP | 08137686 A | 5/1996 |
| JP | 2001337864 A | 12/2001 |
| JP | 2003316459 A | 11/2003 |

OTHER PUBLICATIONS

Office Action for corresponding Japanese Application No. 2005-220012, dated Feb. 12, 2008.

* cited by examiner

*Primary Examiner* — Beemnet Dada
*Assistant Examiner* — Fikremariam A Yalew
(74) *Attorney, Agent, or Firm* — Matthew B. Dernier; Gibson & Dernier LLP

(57) ABSTRACT

Managing the use of an optical disc drive by a program at high security. An OS of a host apparatus 100 sends one user certificate incorporating the policy information defining the use contents permissible for the optical disc drive 200 and a user key to the optical disc drive 200 under a secure environment (S3). On the other hand, the program running on the OS is authorized, and the user key is passed to the authorized program (S6). The optical disc drive 200 authorizes the program using the user key within the user certificate and the user key for the program and specifies the policy information corresponding to the user key (S7). Thereafter, the optical disc drive 200 permits the application program to gain access to the self-resource within the limits of the contents defined in the policy information (S8).

15 Claims, 2 Drawing Sheets

USE MANAGEMENT METHOD FOR PERIPHERAL DEVICE, ELECTRONIC SYSTEM AND COMPONENT DEVICE THEREOF

CROSS REFERENCE TO RELATED APPLICATION

The present application claims priority from Japanese Application No. 2005-220012 filed Jul. 29, 2005, the disclosure of which is hereby incorporated by reference herein.

BACKGROUND OF THE INVENTION

1. Field of the Invention

The present invention relates to a use management method for a peripheral device such as a disk, a disc drive unit or other devices for use on a computer for a host apparatus and the like, and an electronic system that is suitable for performing this method.

2. Description of the Related Art

A processor of a computer handles electronic information such as digital data. The electronic information has such a characteristic that is easy to copy or alter and its contents are not deteriorated. Also, it has such a characteristic that the contents can be circulated without depending on the type of medium for recording or transferring the contents.

These characteristics are intrinsic advantages of the electronic information, but concurrently have a problem; once an illegal copy is created, the illegal copy may be distributed through the Internet and illegally used.

Hence, various developments and proposals for a copy management technique of the electronic information and an access management technique to the electronic information have been made.

SUMMARY OF THE INVENTION

However, a problem of avoiding the copy management technique and the access management technique by means of software or hardware is not overcome. For example, in an electronic system in which the disc drive unit for mounting a disc medium recording the electronic information is connected to the host apparatus, if the copy management technique or the access management technique is avoided, the copy or falsification of the recorded information on the disc medium may be illegally made.

The present invention has been made to solve the above-mentioned problems, and it is an object of the present invention to provide a new technique for appropriately managing the use authority of peripheral devices.

In order to accomplish the above object, the present invention provides a use management method for a peripheral device, an electronic system and component device thereof.

A use management method for a peripheral device according to the present invention comprises a step of a host apparatus sending the policy information defining the use contents permissible for a predetermined peripheral device and the key information for authorization to the peripheral device, a step of the host apparatus causing a program operable on the self apparatus to make a process for reading the intrinsic information having the substantially same contents as the key information sent to the peripheral device, and a step of the peripheral device making a determination whether or not the program gaining access to the self-device with the intrinsic information is valid by collating the intrinsic information with the received key information, and permitting the program to use the peripheral device according to the received policy information, if the program is determined to be valid. Thereby, it is possible for the peripheral device side to manage and control the use of the peripheral device from the program.

With this invention, the use of the peripheral device by the program operating on the host apparatus can be restricted on the peripheral device side by sending the appropriate policy information from the host apparatus to the peripheral device.

DETAILED DESCRIPTION OF THE PREFERRED EMBODIMENTS

Figure 1:
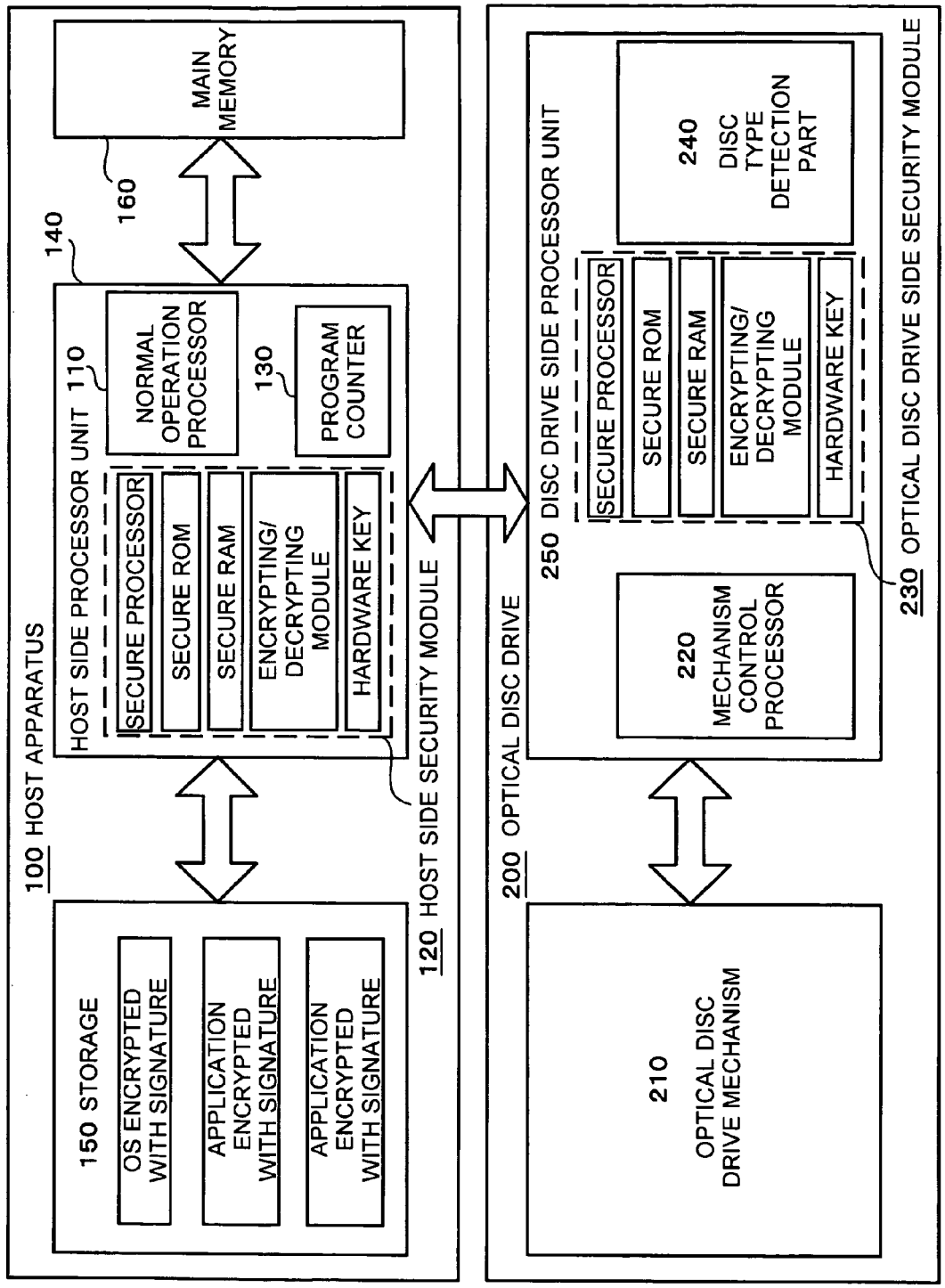
FIG. 1 is a block diagram showing the configuration of an electronic system according to this embodiment of the present invention.

FIG. 1 is a block diagram showing the configuration of an electronic system according to one embodiment of the present invention. The electronic system of this embodiment comprises a host apparatus 100 such as a general purpose computer and an optical disc drive 200 that is one example of peripheral device.

The host apparatus 100 comprises a host side processor unit 140 having a normal operation processor 110, a host side security module 120 and a program counter 130, a storage 150 for encrypting and storing an OS and an application program with a digital signature appended, and a main memory 160 over which the OS and the application program are expanded.

The normal operation processor 110 is the processor for executing the OS and the application program running on the OS.

The host side security module 120 performs a security process on the host apparatus 100. The normal operation processor 110 of this embodiment can not access any information within the host side security module 120. The storage 150 is comprised of a hard disc drive, and the main memory 160 is comprised of a DRAM, for example.

As will be easily understood from the explanation described above, the connection form of the host side processor unit 140, the storage 150 and the main memory 160 within the host apparatus 100 is not limited to the configuration as shown in FIG. 1. Though the memory controller and the I/O are not shown in FIG. 1, it is not intended to exclude a form where they are provided in appropriate locations.

The host side security module 120 comprises a secure processor, a secure ROM, a secure RAM, an encrypting/decrypting module, and hardware key, which are separate and independent from the normal operation processor 110. The term "secure" as used means that the security measures are provided.

The secure ROM stores an IPL (Initial Program Loader) and a security processing program on the host apparatus 100. The program stored in this secure ROM can be executed only by the secure processor. The secure RAM functions as temporary storage means when the security processing program is executed.

The encrypting/decrypting module performs an encryption process for restricting the perusal of contents on the secure RAM and the secure ROM from the outside, a process for decrypting the OS or application program stored in the storage 150 in the encrypted state, and a process for signature and signature verification. The hardware key is intrinsic to the host apparatus 100.

This host side security module 120 extends a security function of the OS. When the host side security module 120 functions, the OS performs the processing under the secure environment, namely, under the operation environment where the security measures are taken.

An optical disc drive 200 of this embodiment deals with plural kinds of disc media such as a CD (Compact Disc), a DVD (Digital Versatile Disc), and a BD (Blue-Ray Disc). The optical disc drive 200 comprises an optical disc drive mechanism 210 such as an optical pickup or an actuator and a disc drive side processor unit 250. The disc drive side processor unit 250 mounts a mechanism control processor 220 for controlling the optical disc drive mechanism 210, an optical disc drive side security module 230, and a disc type detection part 240 for discriminating the type of disc media on the optical disc drive 200.

The optical disc drive side security module 230 performs a security process on the optical disc drive 200, and has the almost same configuration as the host side security module.

That is, the optical disc drive side security module 230 comprises a secure processor separate and independent from the mechanism control processor 230, a secure ROM storing the security processing program on the optical disc drive 200, a secure RAM, an encrypting/decrypting module, and a hardware key intrinsic to the optical disc drive.

[Use Management Method for Optical Disc Drive]

A use management method for peripheral device in the electronic system as configured in the above manner will be described below. Herein, an example of resource management is given in which the application program operating on the host apparatus 100 gains access to the disc media on the optical disc drive 200.

Figure 2:
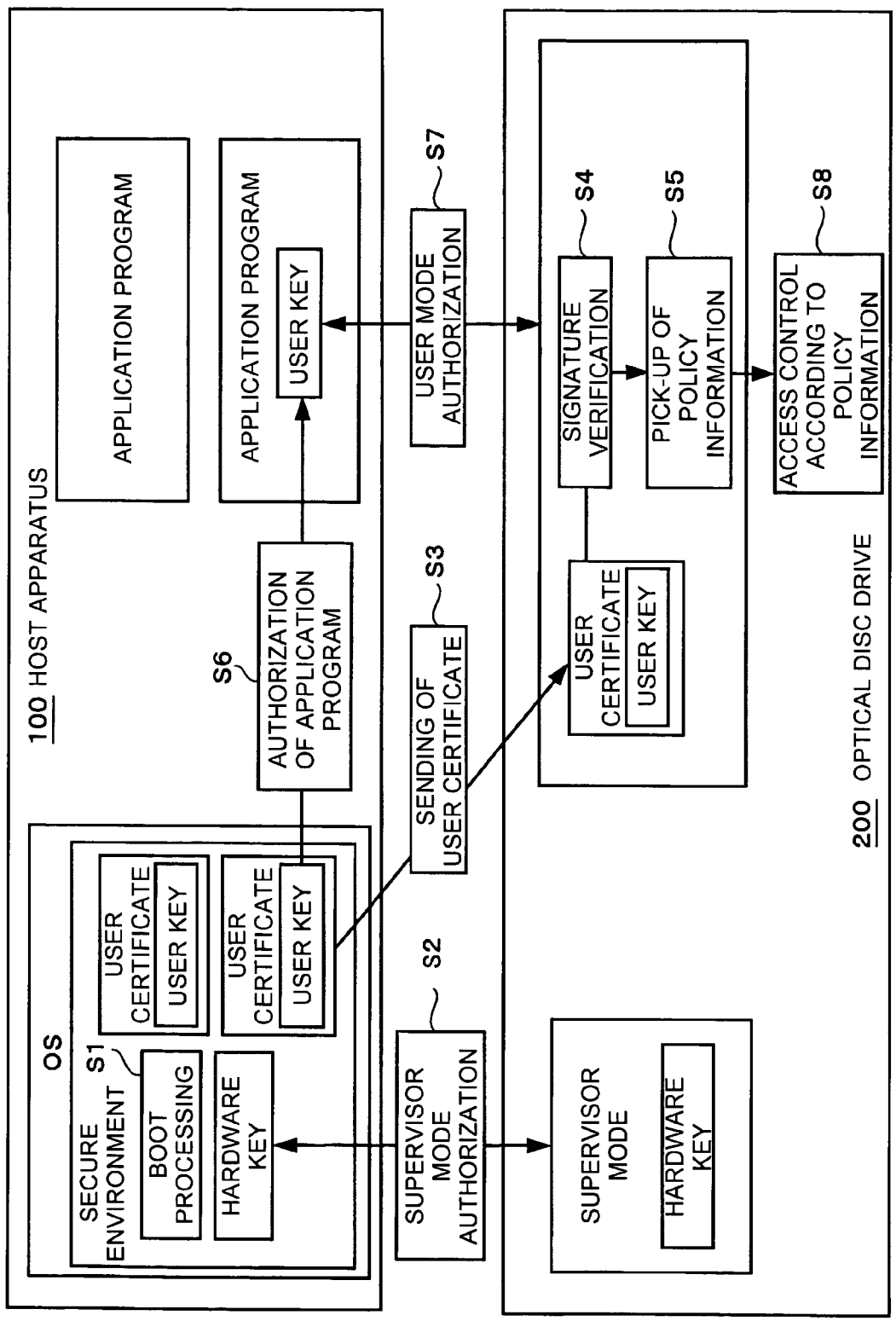
FIG. 2 is a diagram for explaining a resource management method for an optical disc drive.

FIG. 2 shows a resource management procedure in the electronic system.

In FIG. 2, if the power of the host apparatus 100 is turned on, the secure processor of the host apparatus 100 performs a boot processing in accordance with an IPL stored in the secure ROM (step S1). More specifically, the secure processor issues an initialization instruction to the optical disc drive 200, decrypts the OS stored in the storage 150, and expands it over the main memory 160.

Then, the secure processor verifies the validity of a digital signature appended to the OS expanded over the main memory 160 in accordance with a program stored in the secure ROM. As a result of verification, if any falsification is found, the secure processor notifies the user of the host apparatus 100. On the other hand, if the signature is determined to be valid as a result of verification, the secure processor passes an address of the OS on the main memory 160 stored in the program counter 130 to the normal operation processor 110.

In this manner, the normal operation processor 110 acquires an execution authority of the OS. However, the process of the OS under the secure environment is successively performed by the secure processor.

The secure processor of the optical disc drive 200 that is receiving an initialization instruction from the secure processor of the host apparatus 100 performs an initialization process of the optical disc drive 200. Then, the secure processor of the host apparatus 100 and the secure processor of the optical disc drive 200 make the mutual authorization in a supervisor mode in accordance with a security program stored in the secure ROM (step S2). The mutual authorization is performed employing the hard keys contained in the host side security module 120 and the optical disc drive side security module 230.

Subsequently, the secure processor of the host apparatus 100 sends a user certificate incorporating a user key and the policy information associated to the optical disc drive 200 (step S3). Preferably, to prevent pilferage of the user certificate, the user certificate is encrypted using a session key generated by supervisor authorization. The user as referred to herein is an application program, and the user key is identification information of the application program. This user key is registered in the OS by a provider of the application program. When the application program is installed in the host apparatus 100, it may be automatically registered in the OS.

The policy information in this embodiment defines the use mode of the optical disc drive 100 and the disc media on the optical disc drives which are permitted for the application program that is authorized by the OS, for example, the application program to which the user key is given by authorization. In this example, the policy information includes the type of usable disc media (e.g., optical disk/DVD/CD), the use term of validity of the disk, and the use frequency of the disk. The policy information is encrypted and stored with signature in the storage 150.

The OS under the secure environment appends the digital signature to the user certificate that is a digital certificate for verifying the validity on the receiving side, and sends this user certificate to the optical disc drive 200.

If this user certificate is received, the security processor on the optical disc drive 200 verifies the validity of the digital certificate in accordance with a program stored in the secure ROM (step S4). If the digital certificate is approved as valid, it proves that the user certificate is issued from the valid agency. In this case, the secure processor on the optical disc drive 200 accepts the user key and the policy information included in the user certificate, associates them (if one of them is identified, the other can be identified), and passes them to the mechanism control processor.

If the digital signature is not valid, there is possibility that the user certificate was falsified or forged, whereby the secure processor on the optical disc drive 200 cancels the user certificate.

In this embodiment, the intrinsic user certificate is held for every application program within the host side security module 120. The user certificate is updated by the OS and held every time the new application is added.

The secure processor of the host apparatus 100 sends one user certificate corresponding to the application program to be operated to the optical disc drive 200. The secure processor of the optical disc drive 200 makes the signature verification process for the received user certificate (step S4) and picks up the policy information (step S5).

Although the steps S2 to S5 are performed after the boot processing (step S1) in the above explanation, they may be incorporated into the boot processing.

An execution time process of the application process will be described below.

In the electronic system of this embodiment, the secure processor of the host apparatus 100 also expands the application program stored in the storage 150 over the main memory 160. More particularly, the secure processor of the host apparatus 100 decrypts the application program stored in the storage 150 in encrypted state, and expands it over the main memory 160. And application program is authorized (step S6). This authorization is made by verifying the validity of signature appended to the application program, for example. As a result of the verification, if any falsification of the application program is found, the secure processor deletes the application program from the main memory 160. On the other hand, if the signature is determined to be valid as a result of verification, the secure processor passes to the application program the user key having the same contents as the user key included in the user certificate according to the type of application program.

The secure processor of the host apparatus 100 expands the application program over the main memory 160, and then passes the address of the application program in the main memory 160, which is stored in the program counter 130, to the normal operation processor 110. In this manner, the normal operation processor 110 acquires the execution authority of the application program.

The application program executed by the normal operation processor 110 gains access to the optical disc drive 200 in a user mode, employing the user key acquired at step S6.

The mechanism control processor 220 of the optical disc drive 200 authorizes the application program as the user, employing the user key owned by itself (incorporated into the user certificate) and the user key for the application program, upon being accessed from the application program (step S7). This authorization is mutual authorization using the user key. At this time, the policy information corresponding to the user key that the application program has is specified, whereby the application program is only permitted to gain access to the optical disc drive 200 in accordance with this policy information.

In this manner, the use of the optical disc drive 200 from the application program can be controlled on the side of the optical disc drive 200 (step S8).

If the media is changed from DVD-ROM to DVD-R, in the case where only DVD-ROM is defined as the usable disc media in the policy information associated with the certain application program, but DVD-R and CD-R are not defined, the mechanism control processor 220 accepts the detection result of the media from the disc type detection part 240, and stops the application program to use the optical disc drive 200, because the disc media not defined in the policy information is inserted into the optical disc drive 200. Thus, the illegal replacement of the disc media can be prevented.

In the form in which the security modules 120 and 230 can communicate safely, the non-code communication may be employed at the steps S3 and S7.

Since only the reliable application program can step into the authorization in the user mode at step S7 in the electronic system of this embodiment, the user mode authorization (step S7) is processed by the mechanism control processor 220, but may be processed by the security processor within the optical disc drive side security module 230, for example.

What is claimed is:

1. A use management method for a peripheral device comprising:
   a step of providing a host apparatus with a normal operation processor and a first disparate secure processor;
   a step of providing a predetermined peripheral device connected to the host apparatus with a mechanism control processor and a second disparate secure processor, the predetermined peripheral device being a disc drive unit;
   a step of said host apparatus sending policy information defining use contents permissible for said predetermined peripheral device and key information identifying an application program for authorization to said peripheral device;
   a step of said host apparatus causing the application program operable on said host apparatus to read intrinsic information having substantially same content as the key information sent to said peripheral device; and
   a step of said peripheral device making a determination whether or not said application program gaining access to the peripheral device with said intrinsic information is valid by collating said intrinsic information with said received key information, and permitting said program to use the peripheral device according to said received policy information, if said program is determined to be valid.

2. The use management method according to claim 1, wherein said host apparatus authorizes said program, and starts said program and causes said program to make a process for reading said intrinsic information, only if said program is determined to be valid as a result of authorization.

3. The use management method according to claim 1, wherein said host apparatus sends said policy information as a digital certificate appended with a digital signature to said peripheral device, and said peripheral device cancels said digital certificate, before said determination, if the digital signature appended to said received digital certificate is not valid.

4. The use management method according to claim 1, wherein said peripheral device is having control means and a mounting mechanism for a disc medium recording the electronic information readable by said program, and said policy information comprises, as said use contents, at least one of the kind of disc medium usable on said mounting mechanism, and a term of validity or use frequency of said electronic information that can be identified in said control means.

5. The use management method according to claim 1, wherein said host apparatus constructs an operation environment for said program securely, and performs said sending and said process in an operation environment independent from the operation environment for said program.

6. The use management method according to claim 5, further comprising making the mutual authorization with said peripheral device using a hardware key intrinsic to each of said host apparatus and said peripheral device before sending said policy information from said host apparatus.

7. An electronic system consisting of a host apparatus and a predetermined peripheral device connected via a communications channel, wherein
   said predetermined peripheral device is a disc drive unit;
   said host apparatus has first control means and first security means that operate independently;
   said peripheral device connected via the communications channel to the host apparatus has second control means and second security means that operate independently;
   said first control means executes an operating system and a program running on said operating system;
   said first security means sends the policy information defining use contents permissible for said peripheral device and key information identifying said program for authorization to said peripheral device, and causes said program to read the intrinsic information having substantially same content as the key information sent to said peripheral device;
   said second control means controls the operation permissible for said peripheral device; and
   said second security means makes a determination whether or not said program is valid by collating said intrinsic information with said received key information, when said program gains access to the peripheral device with said intrinsic information, and causes said program to pass a use mode according to said received policy information to said second control means, if said program is determined to be valid.

8. The electronic system according to claim 7, wherein said host apparatus further comprises storage means for storing said operating system and said program that are encrypted, and a program memory for expanding said operating system and said program, said first security means decrypts said operating system and said program stored in said storage means under a predetermined condition, and expands said operating system and said program that are decrypted over said program memory, and said first control means executes said operating system and said program that are expanded over said program memory.

9. The electronic system according to claim 8, wherein said program is stored in said storage means in a state where digital signature is appended, and said first security means verifies the validity of said digital signature after expanding said decrypted program over said program memory, and disables said program expanded over said program memory to be executed, if the digital signature is invalid.

10. The electronic system according to claim 7, wherein said first security means sends said policy information to said guest side security processing means in a form of the digital certificate with digital signature appended, and said second security means verifies the validity of said digital signature after receiving said digital certificate, and passes the use mode according to said policy information to said second control means, only if said digital signature is valid.

11. The electronic system according to claim 7, wherein said first control means and said first security means comprise the processors that operate independently of each other, and said second control means and said second security means comprise the processors that operate independently of each other.

12. The electronic system according to claim 7, wherein said first security means performs a boot processing including the initial control at the time of booting said host apparatus and an initialization instruction to said peripheral device, and said second security means perform the initial control at the time of booting said peripheral device.

13. The electronic system according to claim 12, wherein said first security means makes the mutual authorization with said second security means employing a hardware key, after said boot processing.

14. A host apparatus capable of connecting a predetermined peripheral device, comprising first control means and first security means that operate independently;

wherein said predetermined peripheral device is a disc drive unit;

wherein said first control means executes an operating system and a program running on said operating system; and said first security means sends the policy information defining use contents permissible for said peripheral device connected to the host apparatus and key information identifying said program for authorization to said peripheral device, and causes said program to read the intrinsic information having substantially same contents as the key information sent to said peripheral device;

whereby a determination is made whether or not said program is valid by collating said intrinsic information with said received key information, when said program gains access to the peripheral device with said intrinsic information, and permits said program to operate in the use mode according to said received policy information, if said program is determined to be valid.

15. An electronic system comprising:

a host apparatus and a peripheral device connected to said host apparatus, said peripheral device comprising second control means and second security means that operate independently, and said predetermined peripheral device being a disc drive unit;

wherein said host apparatus executes an operating system and an application program running on said operating system, sends the policy information defining use contents permissible for said peripheral device and key information identifying said application program for authorization to said peripheral device, and causes said program to read the intrinsic information having substantially same content as the key information sent to said peripheral device;

said second control means controls the operation permissible for said peripheral device; and said second security means makes a determination whether or not said program is valid by collating said intrinsic information with said received key information, when said program gains access to the peripheral device with said intrinsic information, and causes said program to pass the use mode according to said received policy information to said second control means, if said program is determined to be valid.

* * * * *